(No Model.)
J. HARPER.
BICYCLE SUPPORT.
No. 591,602.　　　　　　　　　Patented Oct. 12, 1897.
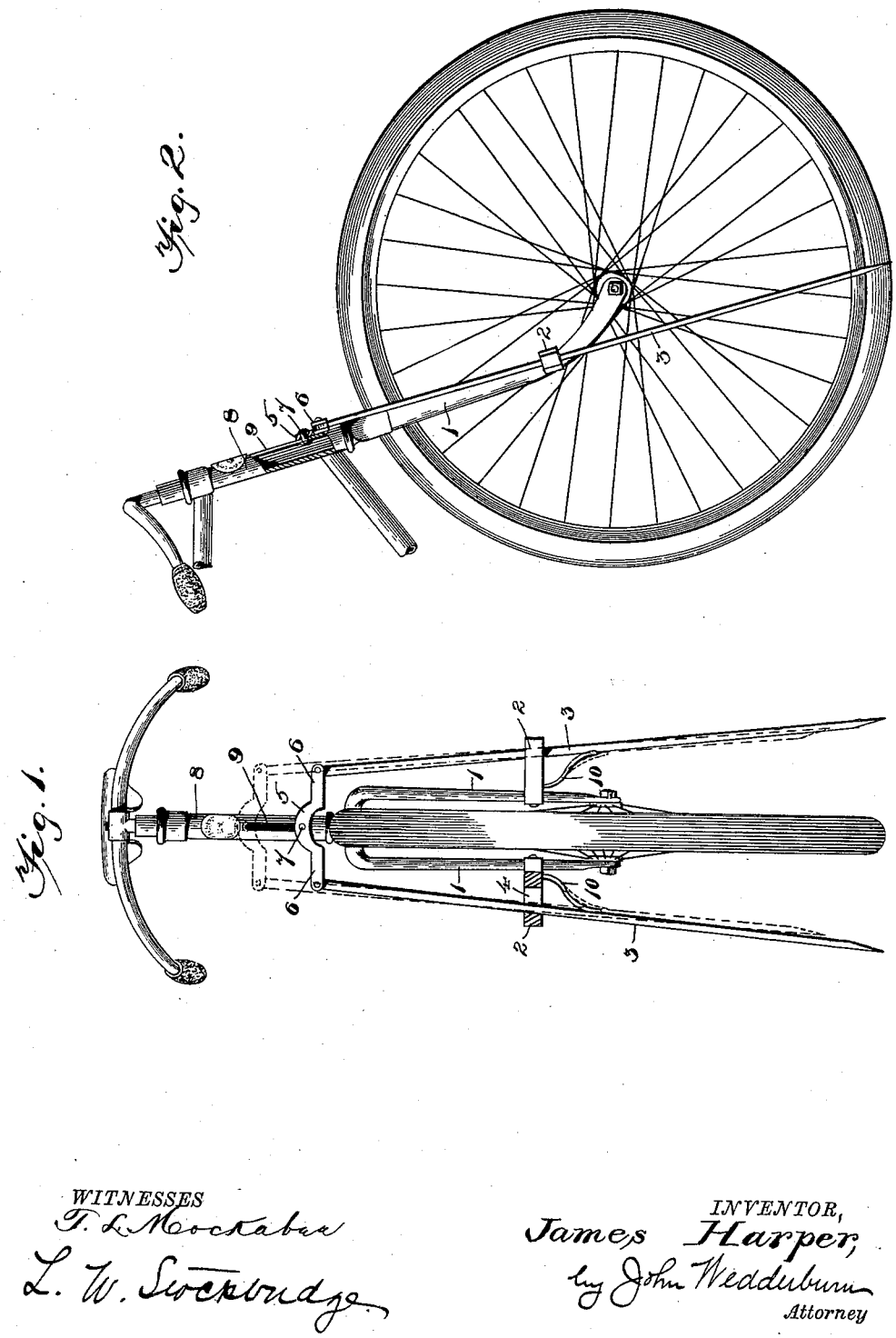
WITNESSES
F. L. Mockabee
L. W. Stockbridge
INVENTOR,
James Harper,
by John Wedderburn
　　Attorney

UNITED STATES PATENT OFFICE.

JAMES HARPER, OF CANNONSBURG, PENNSYLVANIA.

BICYCLE-SUPPORT.

SPECIFICATION forming part of Letters Patent No. 591,602, dated October 12, 1897.

Application filed November 7, 1896. Serial No. 611,391. (No model.)

*To all whom it may concern:*

Be it known that I, JAMES HARPER, a citizen of the United States, residing at Cannonsburg, in the county of Washington and State of Pennsylvania, have invented certain new and useful Improvements in Bicycle-Supports; and I do hereby declare the following to be a full, clear, and exact description of the invention, such as will enable others skilled in the art to which it appertains to make and use the same.

This invention has reference to a novel construction in a bicycle-support; and it consists in the features of construction hereinafter fully described and claimed.

In the accompanying drawings, forming a part of this specification, Figure 1 is a front elevation of a bicycle provided with a supporting device constructed in accordance with this invention and showing said support in operative position in full lines and in inoperative position in dotted lines. Fig. 2 is a vertical section of the same.

Referring now to said drawings, 1 indicates the fork of a bicycle provided with lateral projections 2. The said bicycle-support consists of two legs 3, that pass through openings 4 in said projections 2 and which are pivoted at their upper ends to the sliding plate 5 by means of the legs 6 upon said plate. The distance between the pivots of the legs 3 is less than the distance between the openings 4 in the projections 2, so that as said sliding plate is moved downwardly the lower ends of the legs are moved apart, and vice versa when the plate is moved upwardly. Any approved construction can be used for holding the plate at the upper or lower limit of its movement conveniently, consisting of a pin secured to said plate 5 and which projects into a slot 9 in said post 8, and thus the movement of the plate is limited by reason of the pin coming in contact with the end walls of the slot, while the slot serves as a guide therefor. I have also shown springs 10, that are fastened to the projections 2 and serve to hold the lower legs 3 outwardly under tension.

It will be seen from the foregoing description that a bicycle-support constructed in this manner is not only inexpensive, light, and durable, and occupies but little space, but is also ready for operation, the only thing being necessary to throw it into operative position being to move the plate 5 downwardly until the lower ends of the legs 3 meet the ground.

Having thus described my invention, what I claim as new, and desire to secure by Letters Patent, is—

The combination with a bicycle having the lateral projections 2 and springs 10, of the sliding plate 5 having pivoted legs 3 passing through openings in said projections and engaging said springs, substantially as described.

In testimony whereof I have signed this specification in the presence of two subscribing witnesses.

JAMES HARPER.

Witnesses:
 ALEX. SPEER,
 DANIEL DAY.